US009370077B2

(12) United States Patent
Rietman et al.

(10) Patent No.: US 9,370,077 B2
(45) Date of Patent: Jun. 14, 2016

(54) ROBUST DAYLIGHT INTEGRATION WITH THE AID OF CODED LIGHT

(75) Inventors: Ronald Rietman, Eindhoven (NL); Lorenzo Feri, Eindhoven (NL); Michel Cornelis Josephus Marie Vissenberg, Roermond (NL); Willem Franke Pasveer, Dordrecht (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 96 days.

(21) Appl. No.: 14/126,248

(22) PCT Filed: Jun. 1, 2012

(86) PCT No.: PCT/IB2012/052773
§ 371 (c)(1),
(2), (4) Date: Dec. 13, 2013

(87) PCT Pub. No.: WO2012/172453
PCT Pub. Date: Dec. 20, 2012

(65) Prior Publication Data
US 2014/0125233 A1 May 8, 2014

(30) Foreign Application Priority Data
Jun. 16, 2011 (EP) .................................... 11170155

(51) Int. Cl.
*H05B 37/02* (2006.01)
*H05B 39/04* (2006.01)
(Continued)

(52) U.S. Cl.
CPC ............ *H05B 37/02* (2013.01); *H05B 33/0848* (2013.01)

(58) Field of Classification Search
USPC ................................................. 315/155, 149
See application file for complete search history.

(56) References Cited

U.S. PATENT DOCUMENTS 5,742,340 A * 4/1998 Alves .................... H04N 5/2351
348/255
6,548,967 B1 4/2003 Dowling et al.
(Continued)

FOREIGN PATENT DOCUMENTS

JP H10162967 A 6/1998
JP 2000505932 A 5/2000
(Continued)

OTHER PUBLICATIONS

Ashish Pandharipande et al; "Daylight Integrated Illumination Control of LED Systems Based on Enhanced Presence Sensing", Energy and Buildings, No. 43, 2011, pp. 944-950.

*Primary Examiner* — Adam Houston
(74) *Attorney, Agent, or Firm* — Meenakshy Chakravorty

(57) ABSTRACT

The present invention relates to a method of controlling a dimmable luminaire co-arranged with a light sensor at a first level of a room and illuminating a second level of the room, comprising: determining an output path parameter representing a relation between the amount of light emitted from the luminaire and a luminaire illumination value at the second level, which results from the emitted amount of light; and repeatedly: determining an external illumination value at the second level, which external illumination value represents illumination by other sources than the luminaire, by means of values of the presently emitted amount of light, the output path parameter, and light information originating from the light sensor; and controlling the dimming level of the luminaire on basis of the external illumination value in order to meet a predetermined illumination condition for the total illumination at the second level.

11 Claims, 1 Drawing Sheet

(51) Int. Cl.
*H05B 41/36* (2006.01)
*H05B 33/08* (2006.01)

(56) References Cited

U.S. PATENT DOCUMENTS

| | | | |
|---|---|---|---|
| 2008/0074872 A1 | 3/2008 | Panotopoulos | |
| 2009/0015175 A1 | 1/2009 | Chiang | |
| 2010/0021976 A1 | 1/2010 | Lerchl et al. | |
| 2010/0102730 A1 | 4/2010 | Simon et al. | |
| 2010/0171429 A1 | 7/2010 | Garcia et al. | |
| 2010/0189429 A1* | 7/2010 | Butterworth | G03B 7/08 396/155 |
| 2014/0191665 A1* | 7/2014 | Gommans | H05B 37/0218 315/152 |
| 2015/0025391 A1* | 1/2015 | Mackie | A61B 5/0071 600/476 |
| 2015/0102730 A1* | 4/2015 | Eisele | H05B 33/0857 315/152 |
| 2015/0264777 A1* | 9/2015 | Leinen | H05B 37/02 315/152 |

FOREIGN PATENT DOCUMENTS

| | | |
|---|---|---|
| JP | 2011076992 A | 4/2011 |
| WO | 2008078253 A2 | 7/2008 |
| WO | 2009010926 A2 | 1/2009 |
| WO | 2009133505 A1 | 11/2009 |
| WO | 2010048992 A1 | 5/2010 |
| WO | 2010070520 A1 | 6/2010 |
| WO | 2010089596 A2 | 8/2010 |
| WO | 2011010272 A1 | 1/2011 |
| WO | 2011024126 A2 | 3/2011 |

\* cited by examiner

ROBUST DAYLIGHT INTEGRATION WITH THE AID OF CODED LIGHT

FIELD OF THE INVENTION

The present invention relates to a method of controlling a dimmable luminaire co-arranged with a light sensor at a first level of a room and illuminating a second level of the room.

BACKGROUND OF THE INVENTION

Efforts have been made to save energy by controlling the dimming level of luminaires in a room. When a lot of daylight or other external light enters the room there is usually no need for a full power of the luminaires. On the other hand, by putting out the luminaires still the illumination level often becomes too low. Different solutions of controlling the dimming level, i.e. light output level, of luminaires based on determinations of the illumination at a level where people are working have been proposed. A resent control method has been published in an article entitled "Daylight integrated illumination control of LED systems based on enhanced presence sensing", by Ashish Pandharipande and David Caicedo, Energy and Buildings, No. 43 (2011), pp. 944-950. A number of luminaires and co-arranged light sensors are mounted at the ceiling, which is a first level. The luminaires are individually identified by coding of the light that they emit. Initially, the luminaires are turned on at a predetermined dimming level, and a commissioning is performed where the illumination is measured (i) at many positions in a workspace plane, i.e. where the people are supposed to work, which is a second level, and (ii) at the first level. On basis of the measurements a mapping table is calculated, where the illumination values at the second level are mapped to illumination values at the first level. During the following normal operation the illumination is repeatedly detected by means of the light sensors at the first level, and by means of the mapping table corresponding illumination values are determined for a number of positions at the second level. The illumination is divided into a daylight part, i.e. illumination caused by surrounding daylight, and a luminaire part, i.e. illumination caused by all the luminaires. Then an optimization is mathematically performed for all positions in common, and, finally, corresponding dimming levels of the luminaires are set. This is a nice method, which does not need any light sensors at the second level for the continuous operation, and which provides an optimized setting of a plurality of luminaires in common. However the prior art method is unnecessarily complex for many applications. Thus, a simpler method that can be used for one or more luminaires but still does not require level two measurements for the normal operation is desired.

SUMMARY OF THE INVENTION

It is an object of the resent invention to provide a method of luminaire control that alleviates the above-mentioned problems of the prior art.

The object is achieved by a method of controlling a dimmable luminaire co-arranged with a light sensor at a first level of a room and illuminating a second level of the room according to the present invention as defined in claim 1.

Thus, in accordance with an aspect of the present invention, there is provided a method of controlling a dimmable luminaire co-arranged with a light sensor at a first level of a room and illuminating a second level of the room, comprising:

determining an output path parameter representing a relation between the amount of light emitted from the luminaire and a luminaire illumination value at the second level, which results from the emitted amount of light (*height resp. alpha*); and repeatedly:

determining an external illumination value at the second level, which external illumination value represents illumination by other sources than the luminaire, by means of values of the presently emitted amount of light, the output path parameter, and light information originating from the light sensor; and controlling the dimming level of the luminaire on basis of the external illumination value in order to meet a predetermined illumination condition for the total illumination at the second level.

Thus, instead of providing a complex model for illumination mapping by a cumbersome commissioning as in the prior art, the determination of the external illumination value is based on a simple determination of the output path parameter.

In accordance with an embodiment of the method, it further comprises detecting an amount of light received by the light sensor; and dividing the detected amount of light in a luminaire part and an external light part. The light information originating from the light sensor is the external light part. This is an advantageous way of determining the external light part.

In accordance with an embodiment of the method, it comprises coding the light emitted from the luminaire, wherein said dividing the detected amount of light in a luminaire part and an external light part comprises identifying the luminaire part by means of the coding. This is a reliable and accurate way of dividing the detected light.

In accordance with an embodiment of the method, said determining an external illumination value at the second level comprises making an approximate assumption that the ratio between the external light part and the luminaire part is equal to the ratio between the external illumination value and the luminaire illumination value; and calculating the external illumination value as the luminaire illumination value multiplied with the quotient of the external light part and the luminaire light part. According to this embodiment a simple way of determining the external illumination value at the second level is obtained. While being an approximation it has proven accurate enough for most applications.

In accordance with an embodiment of the method, the output path parameter is determined by means of an initial commissioning comprising measuring the luminaire illumination value by means of a light sensor at the second level. The commissioning provides an accurate value of the output path parameter.

In accordance with an embodiment of the method, the output path parameter is a function of the distance between the luminaire and the second level, and the distance is provided as a default value. On one hand this may cause a less accurate parameter, but on the other it could eliminate the need of commissioning. As a close alternative, the output path parameter can be provided as a default value.

In accordance with embodiments of the method, the above-mentioned distance is determined by means of a manual input or by means of a distance sensor, which is co-arranged with the luminaire.

In accordance with an embodiment of the method, the operation of determining an external illumination value at the second level comprises:

toggling the luminaire between a state of outputting a high amount of light and a state of outputting a low amount of light; and detecting the amount of light received by the light sensor at the different states and providing associated detection values;

wherein the detection values constitute said light information originating from the light sensor. The toggling provides for detection of values which will facilitate the determination of the external illumination without having to measure it at the second level.

In accordance with an embodiment of the method, the operation of determining an external illumination value at the second level comprises solving an equation system of:

$$S_{high} = k(I_{ext} + pL_{high}),$$

and $$S_{low} = k(I_{ext} + pL_{low}),$$

where $S_{high}$ and $S_{low}$ are the detection values obtained by means of the light sensor, $I_{ext}$ is the external illumination value, $L_{high}$ and $L_{low}$ are the respective high and low amounts of light output by the luminaire, p is the output path parameter, and k is a return path parameter, wherein the equation system is solved for the unknown factors of external illumination value $I_{ext}$ and return path parameter k. This is an advantageous way of making use of the toggling in order to achieve an accurate value of the external illumination at the second level, and thus of the total illumination at the second level.

These and other aspects and advantages of the invention will be apparent from and elucidated with reference to the embodiments described hereinafter.

BRIEF DESCRIPTION OF THE DRAWINGS

The invention will now be described in more detail and with reference to the appended drawings in which the sole FIGURE is a schematic illustration of a room having luminaires controlled by means of an embodiment of the method according to the present invention.

DESCRIPTION OF PREFERRED EMBODIMENTS

Figure 1:
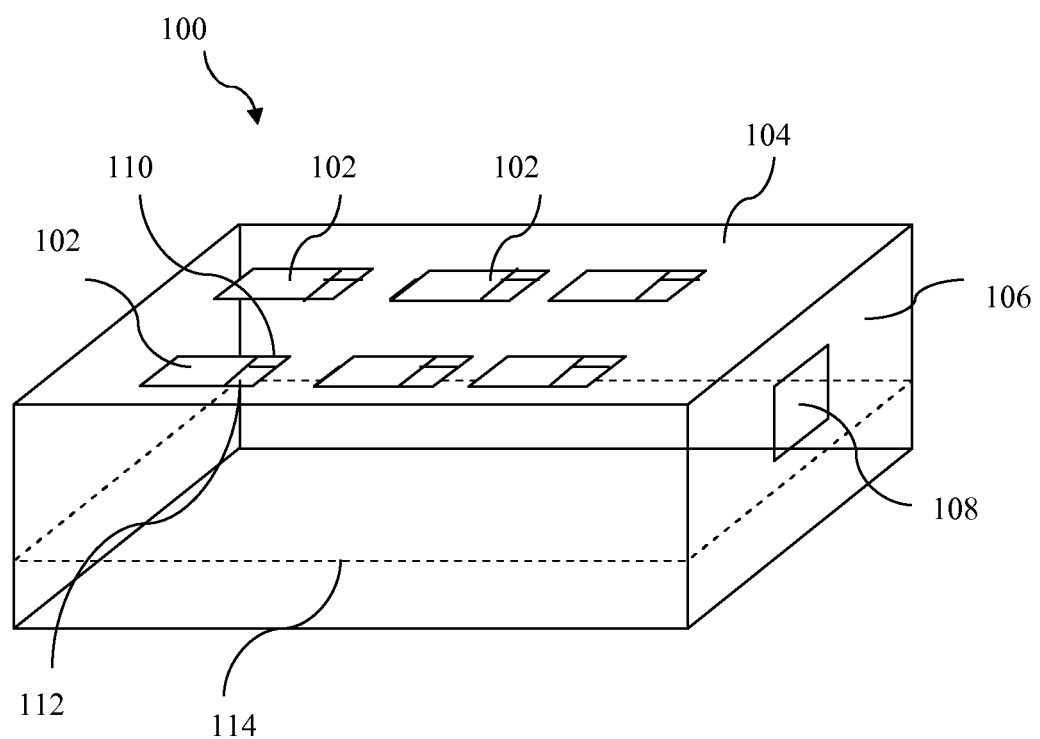

The method of the present invention is for instance applicable to a room 100 where a number of dimmable luminaires 102 are mounted in the ceiling 104, which represents a first level of the room, i.e. a first horizontal plane. One wall 106 of the room 100 is provided with windows 108 admitting daylight, which can be with or without sun light, into the room. Each luminaire 102 is provided with a light sensor 110 and a controller 112. However, alternatively, a separate light sensor can be used. Thus, the luminaire 102 is co-arranged with the light sensor 110 and the controller 112 at the first level 104. A second level 114 is a workspace plane, i.e. the level where people usually are working at. For example, the surface of a desk is positioned at the second level 114.

A first embodiment of the method of controlling a dimmable luminaire is preferably used in a system where the light sensor 110 is integrated in the luminaire 102. If the light sensor 110 is separately arranged, the performance of the method will deteriorate with an increasing distance between the luminaire and the light sensor. According to this first embodiment of the method, the first action is to determine an output path parameter p representing a relation between the amount of light L emitted from the luminaire 102 and a luminaire illumination value $I_{lum}$ at the second level, which luminaire illumination value $I_{lum}$ results from the emitted amount of light. In this embodiment the relation of the output path parameter p is simply set to $p = I_{lum}/L$. Subsequently, some actions, constituting the continuous operation of the luminaire, are repeated with a predetermined time interval. They comprise determining an external illumination value $I_{ext}$ at the second level, which external illumination value $I_{ext}$ represents illumination by other sources than the luminaire 102, by means of values of the presently emitted amount of light L, the output path parameter p, and light information originating from the light sensor 110. More particularly, according to this embodiment, the light information originating from the light sensor 110 constitutes the detected amount of light divided into in a luminaire part $S_{lum}$ and an external part $S_{ext}$. The division is based on some kind of recognition of the light originating from the luminaire 102, such as some kind of coding of the light. The coding can be any known type of coding, such as PWM, OOK, etc., as understood by the person skilled in the art.

The determination of the external illumination value $I_{ext}$ is based on the approximate assumption that the ratio between the external light part $S_{ext}$ and the luminaire part $S_{lum}$ is equal to the ratio between the external illumination value $I_{ext}$ and the luminaire illumination value $I_{lum}$:

$$\frac{I_{ext}}{I_{lum}} = \frac{S_{ext}}{S_{lum}} \qquad \text{eqn. 1}$$

Thus, the external illumination value $I_{ext}$ is obtained as:

$$I_{ext} = I_{lum} \frac{S_{ext}}{S_{lum}} \qquad \text{eqn. 2}$$

The assumption is well based, as will be evident from the following explanation. Assume a luminaire 102 that emits light with a symmetric beam profile $B(\alpha)$, with $\alpha$ the angle with respect to the normal to the exit window of the luminaire 102. The light sensor 110 has a diaphragm to limit the detection cone of the light sensor 110 to an angle $\beta$. Usually, general lighting is implemented with broad beam profiles, typically with a FWHM of about 2×45 degrees. In contrast, the angular range of the light sensor 110 must be limited in order to avoid artifacts, e.g. caused by windows. A common detection cone is in the order of about $\beta=25°$. The flux, emitted by the luminaire 102 within the detection cone of the light sensor 110 is given by $$\phi = \int_0^\beta 2\pi \sin \alpha B(\alpha) d\alpha \approx B(0) 2\pi (1 - \cos \beta) \qquad \text{eqn. 3}$$

Here it is assumed that the intensity function is essentially flat within the relatively small detection cone. The area at the second level that is sensed is given by $$A = \pi H^2 (\tan \beta)^2 \qquad \text{eqn. 4}$$

Here H is the distance between the luminaire 102 and the detection area. This corresponds to the distance between the luminaire 102 and the second level 114. The luminaire illumination value $I_{lum}$ at the second level 114 is then given by $$I_{lum} = \frac{\varphi}{A} \approx \frac{B(0)}{H^2}, \qquad \text{eqn. 5}$$

Here it is assumed that $\beta$ is small, which assumption is accurate enough for the purposes of this calculation. The value of B(0) is determined by the beam profile and the dimming level, both of which are known for the luminaire 102. The value of B(0) can be flashed in the memory of the luminaire before it is shipped, and the dimming level is determined/set by the driver itself. Possibly, the light output of the luminaire may also be self-calibrated by using a photo sensor inside the luminaire, which tracks the lumen depreciation of the luminaire by ageing or dirt. Consequently, the only unknown factor is the height H, and is a part of the output path parameter p, since:

$$p = \frac{I_{lum}}{L} \approx \frac{B(0)}{H^2 L} \qquad \text{eqn. 6}$$

The determination of the height will be discussed in more detail below. It should be noted that the conclusion does not change much if the detailed intensity distribution and detection cone are taken into account, since these details can all be known for the luminaire 102 and light sensor 110 used.

The signal luminaire part $S_{lum}$ of the light detected by the light sensor 110 is proportional to $$S_{lum} \propto R I_{lum} A / H^2, \qquad \text{eqn. 7}$$

where R is the average reflection coefficient of the detection area A at the second level 114. Here projection cosines have been ignored, assuming that β is small. The detection area A and the height H are the same for natural light and artificial, coded light. We can also assume that the reflection factor is about the same, in particular for artificial light with a good color rendering. As a consequence, the comparison of equation 1 above will work well. Additionally, if the illumination caused by the luminaire 102 is known, it can be used for self-calibration of the light sensor 110.

Having thus determined the external illumination value $I_{ext}$, as well as the luminaire illumination value $I_{lum}$, the total illumination at the second level 114, i.e. in the workspace plane is known, and finally the dimming level of the luminaire 102 is adjusted if necessary. The size of the adjustment is determinable by means of the output path parameter, since a desirable adjustment of the light output of the luminaire 102 is related to the desirable adjustment of the total illumination at the second level as $\Delta L = -\Delta I_{tot}/p$. However, the change of illumination is solely a change of external illumination, and thus the adjustment can be determined as in below eqn. 12 as well. Whether an adjustment is to be done or not, depends on a predetermined illumination condition for the total illumination, which for instance can be an interval. This means that if the total illumination value is within the interval, no adjustment is made. Typically, there are standards for a minimum illumination which have to be met, and in order to save as much energy as possible the light output of the luminaire 102 is controlled such that the standard is fulfilled with a minor margin to make sure that the approximations mentioned above could not cause a true illumination below the norm. As mentioned above, the height H is the only unknown factor of the calculations, which in turn gives the output path parameter p. There are different ways to determine the height H during the initial action.

One way is to use a default height. Office height shows relatively small differences in height, typically between 2.4 m and 3.0 m. The worst case of 3 m could be used to ensure a minimum lux value of 500 lux at the second level. In that case, the actual natural illumination level will be underestimated by $H^2/3^2$. For example, when the ceiling is 2.5 m instead of 3.0 m, the system will not dim to a nominal level of e.g. 500 lux, but 720 lux instead. However, this margin is comparable to the margin that is commonly taken nowadays, to account for the uncertainty in back reflection factor.

Another way to determine the output path parameter/height is to perform an initial commissioning wherein the luminaire illumination value is measured by means of a light sensor at the second level. In other words, the system is calibrated with a lux meter once at the beginning. The output path parameter p, and the height H, simply follows from the measured luminaire illumination value and the known light output B(0) of the luminaire 102.

The height H could also be measured automatically by other height sensors in the luminaire 102. For example, the time of flight signal from ultrasound true presence detectors could be used as well. Then the luminaire 102 can be truly auto calibrating in an autonomous way. Other sensors that could provide distance information are e.g. microphones, microwave presence detection sensors, or TOF cameras.

Above a first embodiment of the luminaire control method has been described. According to a second embodiment of the method, similarly to the first embodiment, the first action is to determine an output path parameter p representing a relation between the amount of light L emitted from the luminaire 102 and a luminaire illumination value $I_{lum}$ at the second level, which luminaire illumination value $I_{lum}$ results from the emitted amount of light. Then, some actions, constituting the continuous operation of the luminaire, are repeated with a predetermined time interval. They comprise determining an external illumination value $I_{ext}$ at the second level, which external illumination value $I_{ext}$ represents illumination by other sources than the luminaire 102, by means of values of the presently emitted amount of light L, the output path parameter p, and light information originating from the light sensor 110. More particularly, according to this second embodiment, the light information originating from the light sensor 110 is the sum of a luminaire part $S_{lum}$ and an external part $S_{ext}$. Typically, the light originating from the luminaire 102 is coded, as mentioned in the description of the first embodiment.

The first action is performed as a commissioning as described above for the first embodiment. However, alternatively, the output path parameter, or the illumination at the second level 114, which is related to the output path parameter as described above, is a default value, i.e. a predetermined value that is typically stored in a memory of the controller 112.

In order to obtain useful information from the light sensor 110, the light output of the luminaire is toggled between a state of outputting a high amount of light and a state of outputting a low amount of light, $L_{high}$ and $L_{low}$, and the light sensor 110 detects the corresponding received powers $S_{high}$ and $S_{low}$.

These powers are given by:

$$S_{high} = k(I_{ext} + pL_{high}), \qquad \text{eqn. 8}$$

and $$S_{low} = k(I_{ext} + pL_{low}) \qquad \text{eqn. 9}$$

The controller 112 solves these two equations for the two unknown factors k and $I_{ext}$, where k is a return path parameter describing the relation between the illumination of the second level and the detected amount of light at the light sensor 110. This results in:

$$k = (S_{high} - S_{low})/p(L_{high} - L_{low}), \qquad \text{eqn. 10}$$

and $$I_{ext} = p(L_{high} S_{low} - L_{low} S_{high})/(S_{high} - S_{low}) \qquad \text{eqn. 11}$$

Then it is possible to determine the total illumination value at the second level 114, and to adjust the continuous setting of the luminaire 102 if necessary, so as to fulfill the predetermined criterion. Typically, the need for an adjustment is caused by a change in the external illumination. Thus, the adjustment is determinable as:

$$\Delta L = -\Delta I_{ext}/p \qquad \text{eqn. 12}$$

It should be noted that when there are several dimmable luminaires 102 emitting coded light in the room, which is the typical case, each luminaire as well as the whole group of luminaires can benefit from that by each luminaire 102 detecting coded light from itself as well as from the other luminaires 102. Several different alternatives are feasible, as known per se by the person skilled in the art.

The above embodiments of the method according to the present invention as defined in the appended claims have been described. These should only be seen as merely non-limiting examples. As understood by the person skilled in the art, many modifications and alternative embodiments are possible within the scope of the invention as defined by the appended claims.

It is to be noted that for the purposes of his application, and in particular with regard to the appended claims, the word "comprising" does not exclude other elements or steps, and the word "a" or "an" does not exclude a plurality, which per se will be evident to a person skilled in the art.

The invention claimed is:

1. A method of controlling a dimmable luminaire co-arranged with a light sensor at a first level of a room and illuminating a second level of the room, comprising:
   determining an output path parameter representing a relation between the amount of light emitted from the luminaire and a luminaire illumination value at the second level, which results from the emitted amount of light; and
   repeatedly:
   determining an external illumination value at the second level, which external illumination value represents illumination by other sources than the luminaire, by means of values of the presently emitted amount of light, the output path parameter, and light information originating from the light sensor; and
   controlling the dimming level of the luminaire on basis of the external illumination value in order to meet a predetermined illumination condition for total illumination at the second level.

2. The method according to claim 1, said determining an external illumination value at the second level further comprising:
   detecting an amount of light received by the light sensor; and
   dividing the detected amount of light in a luminaire part and an external part;
   wherein said light information originating from the light sensor is the external light part.

3. The method according to claim 2, comprising coding the light emitted from the luminaire, wherein said dividing the detected amount of light in a luminaire part and an external part comprises identifying the luminaire part by means of the coding.

4. The method according to claim 2, wherein said determining an external illumination value at the second level comprises:
   making an approximate assumption that the ratio between the external light part and the luminaire part is equal to the ratio between the external illumination value and the luminaire illumination value; and
   calculating the external illumination value as the luminaire illumination value multiplied with the quotient of the external light part and the luminaire light part.

5. The method according to claim 4, wherein the output path parameter is determined by means of an initial commissioning comprising measuring the luminaire illumination value by means of a light sensor at the second level.

6. The method according to claim 4, wherein the output path parameter is related to the distance between the luminaire and the second level, and wherein the distance is provided as a default value.

7. The method according to claim 4, wherein the output path parameter is related to the distance between the luminaire and the second level, and wherein the distance is provided by means of a manual input.

8. The method according to claim 4, wherein the output path parameter is related to the distance between the luminaire and the second level, and wherein the distance is provided by means of a distance sensor co-arranged with the luminaire.

9. The method according to claim 1, said determining an external illumination value at the second level comprising:
   toggling the luminaire between a state of outputting a high amount of light and a state of outputting a low amount of light; and
   detecting the amount of light received by the light sensor at the different states and providing associated detection values;
   wherein the detection values constitute said light information originating from the light sensor.

10. The method according to claim 9, said determining an external illumination value at the second level comprising solving an equation system of:

$$S\text{high} = k(I\text{ext} + pL\text{high}) \text{ and}$$

$$S\text{low} = k(I\text{ext} + pL\text{low}),$$

where Shigh and Slow are the detection values obtained by means of the light sensor, Iext is the external illumination value, Lhigh and Llow are the respective high and low amounts of light output by the luminaire, p is the output path parameter, and k is a return path parameter, wherein the equation system is solved for the unknown factors of external illumination value Iext and return path parameter k.

11. The method according to claim 10, wherein the sensor is integrated in the luminaire.

* * * * *